(No Model.) 15 Sheets—Sheet 1.
C. W. WARD.
MACHINE FOR MAKING WIRE CHAIN.

No. 580,438. Patented Apr. 13, 1897.

WITNESSES:
J. F. Finch.
M. T. Lougden.

INVENTOR
C. W. Ward.
BY T. Smith ATTY (No Model.)  15 Sheets—Sheet 2.
C. W. WARD.
MACHINE FOR MAKING WIRE CHAIN.
No. 580,438.  Patented Apr. 13, 1897.
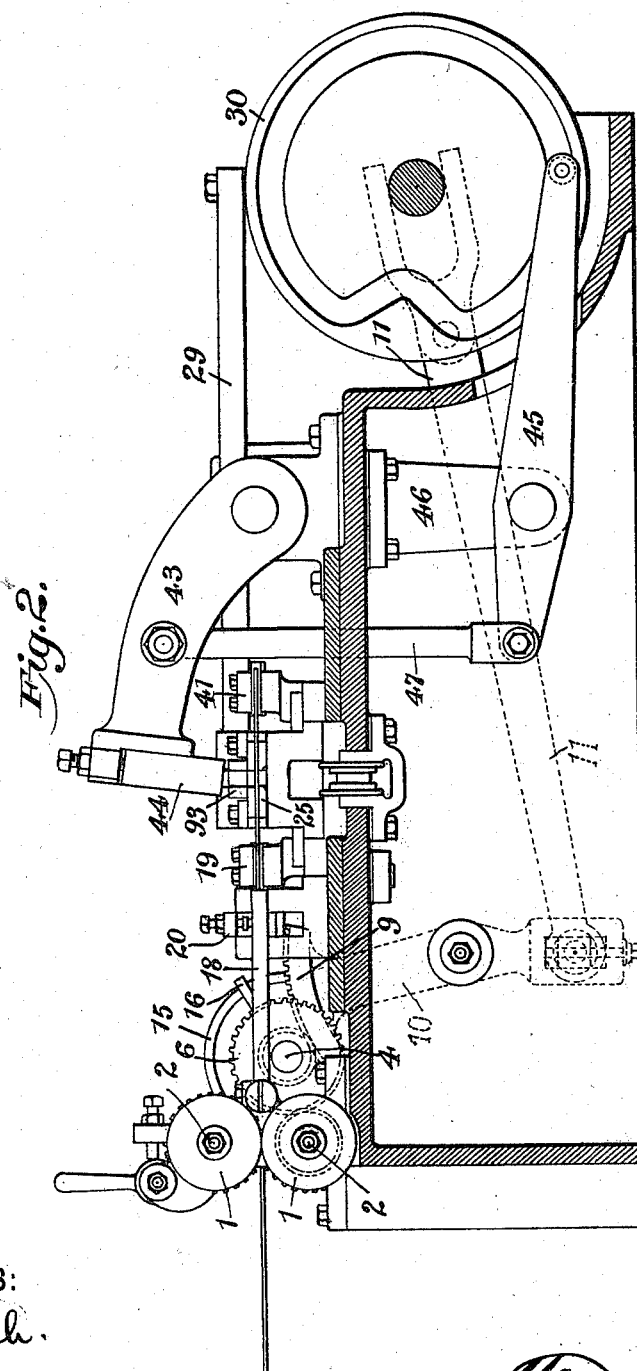
Fig. 2
WITNESSES:
INVENTOR
C. W. Ward.
ATTY (No Model.)
15 Sheets—Sheet 3.

C. W. WARD.
MACHINE FOR MAKING WIRE CHAIN.

No. 580,438.
Patented Apr. 13, 1897.

WITNESSES:

INVENTOR
C. W. Ward.

(No Model.) 15 Sheets—Sheet 4.
C. W. WARD.
MACHINE FOR MAKING WIRE CHAIN.

No. 580,438. Patented Apr. 13, 1897.

WITNESSES:

INVENTOR
C. W. Ward.

(No Model.) 15 Sheets—Sheet 5.
C. W. WARD.
MACHINE FOR MAKING WIRE CHAIN.
No. 580,438. Patented Apr. 13, 1897.

WITNESSES:

INVENTOR
C. W. Ward.

(No Model.) 15 Sheets—Sheet 7.
C. W. WARD.
MACHINE FOR MAKING WIRE CHAIN.

No. 580,438. Patented Apr. 13, 1897.

WITNESSES:

INVENTOR
C. W. Ward.
ATTY (No Model.) 15 Sheets—Sheet 8.
C. W. WARD.
MACHINE FOR MAKING WIRE CHAIN.
No. 580,438. Patented Apr. 13, 1897.

WITNESSES:

INVENTOR
C. W. Ward.
BY ATTY (No Model.) 15 Sheets—Sheet 10.

C. W. WARD.
MACHINE FOR MAKING WIRE CHAIN.

No. 580,438. Patented Apr. 13, 1897.

WITNESSES:
J. F. Finch
M. T. Lougden

INVENTOR
C. W. Ward.
BY
ATTY (No Model.) 15 Sheets—Sheet 14.

C. W. WARD.
MACHINE FOR MAKING WIRE CHAIN.

No. 580,438. Patented Apr. 13, 1897.

WITNESSES:

INVENTOR
C. W. Ward
BY ATTY (No Model.) 15 Sheets—Sheet 15.
C. W. WARD.
MACHINE FOR MAKING WIRE CHAIN.
No. 580,438. Patented Apr. 13, 1897.

WITNESSES:
J. H. Finch
M. J. Lougden

INVENTOR
C. W. Ward.
BY ATTY

UNITED STATES PATENT OFFICE.

CUMMINS WILMINGTON WARD, OF BRIDGEPORT, CONNECTICUT, ASSIGNOR TO THE SMITH & EGGE MANUFACTURING COMPANY, OF SAME PLACE.

MACHINE FOR MAKING WIRE CHAIN.

SPECIFICATION forming part of Letters Patent No. 580,438, dated April 13, 1897.

Application filed May 29, 1896. Serial No. 593,589. (No model.)

*To all whom it may concern:*

Be it known that I, CUMMINS WILMINGTON WARD, a citizen of the United States, residing at Bridgeport, in the county of Fairfield and State of Connecticut, have invented certain new and useful Improvements in Machines for Making Wire Chain; and I do hereby declare the following to be a full, clear, and exact description of the invention, such as will enable others skilled in the art to which it appertains to make and use the same.

My invention relates to machines for automatically making wire chain, but more particularly has reference to machines which manufacture such chain, the links of which have at one end a bow and at the other end two registering eyes disposed in a plane at right angles to that of the bow.

Figure 1:
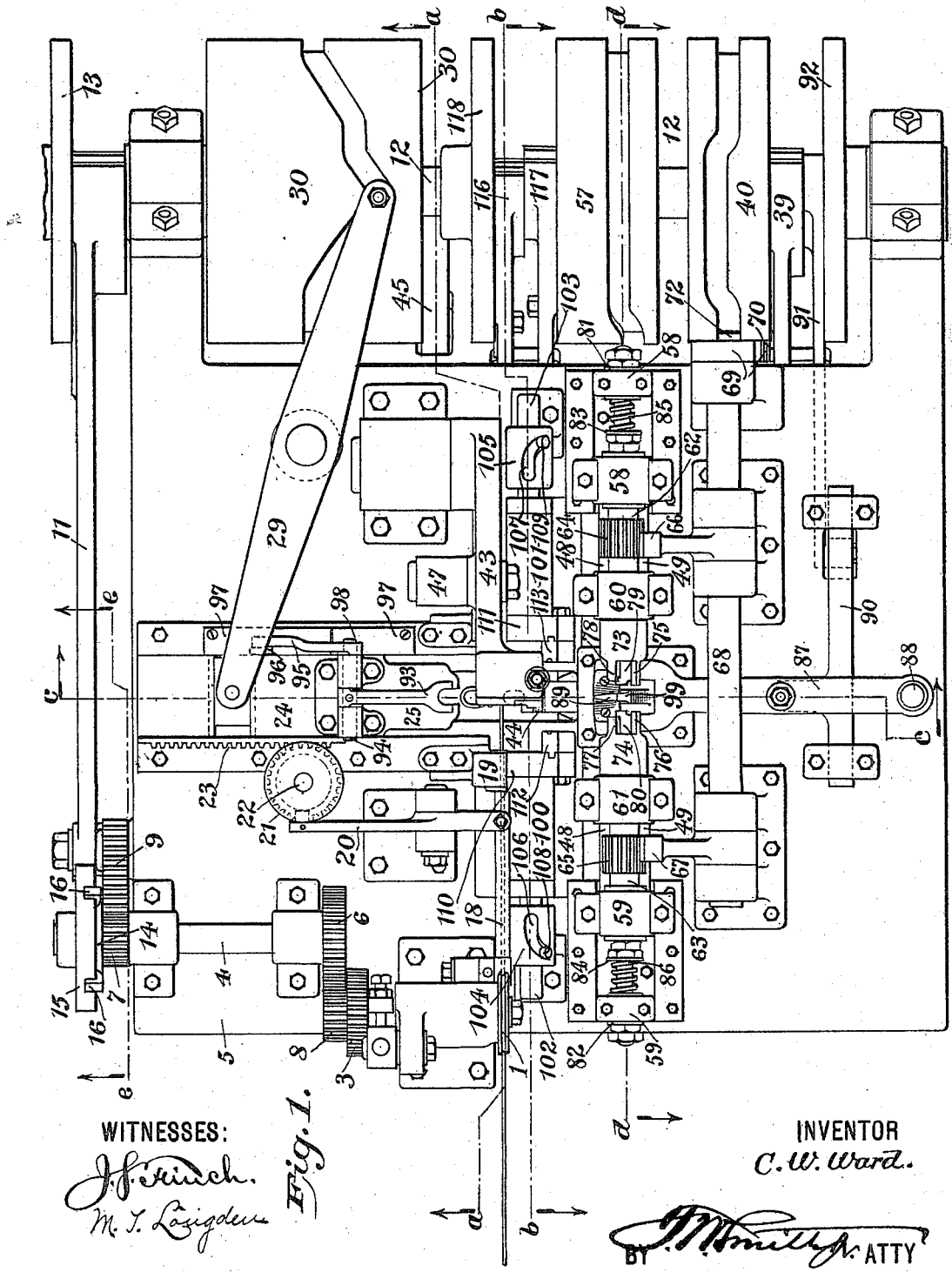
Figure 3:
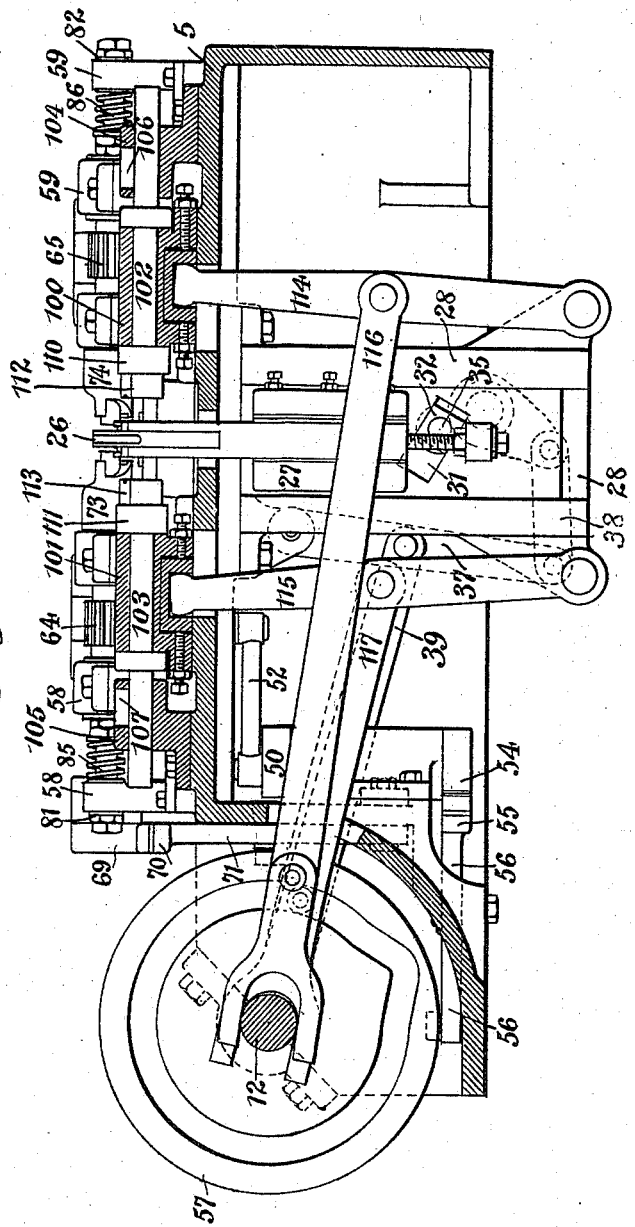
Figure 4:
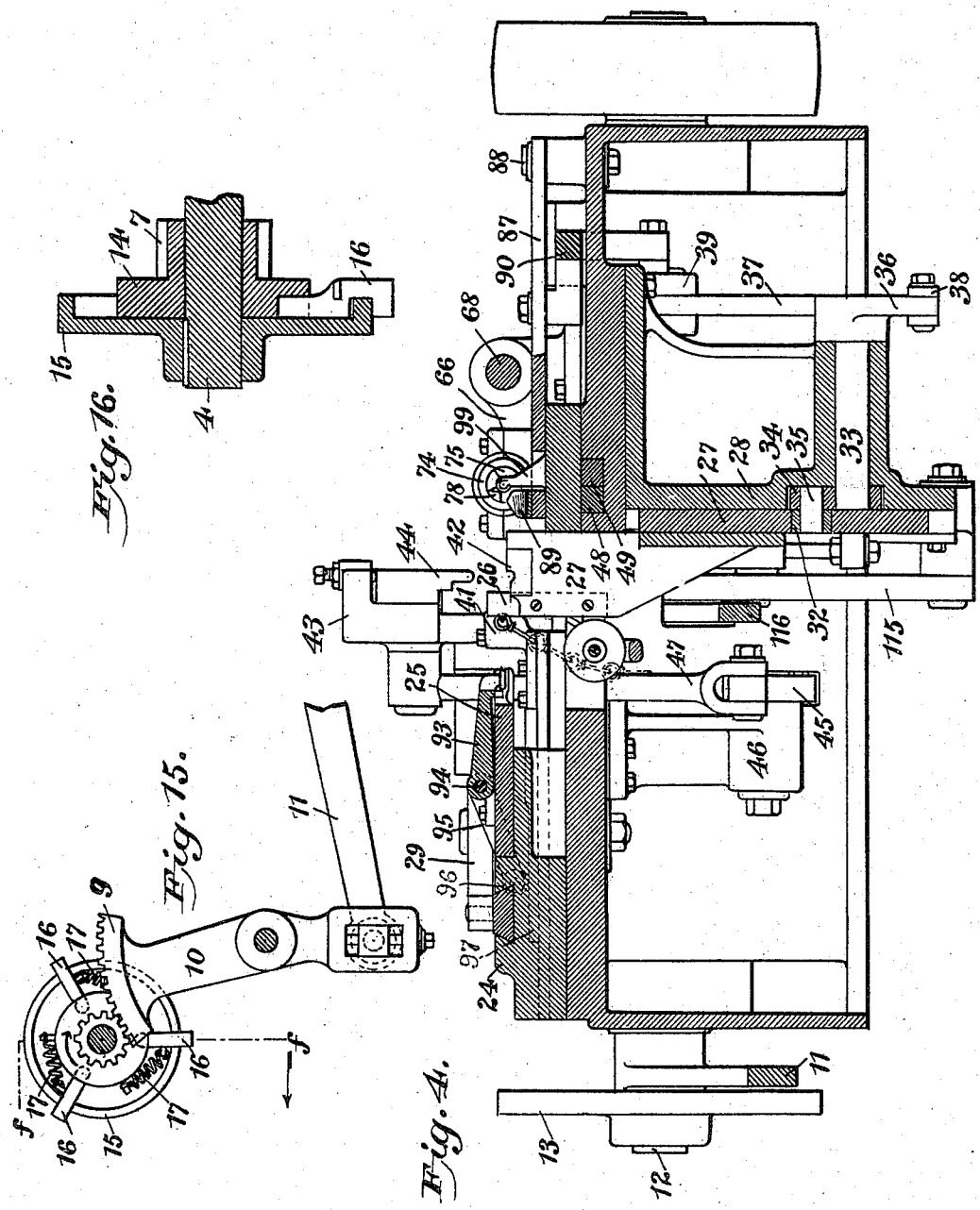
Figure 5:
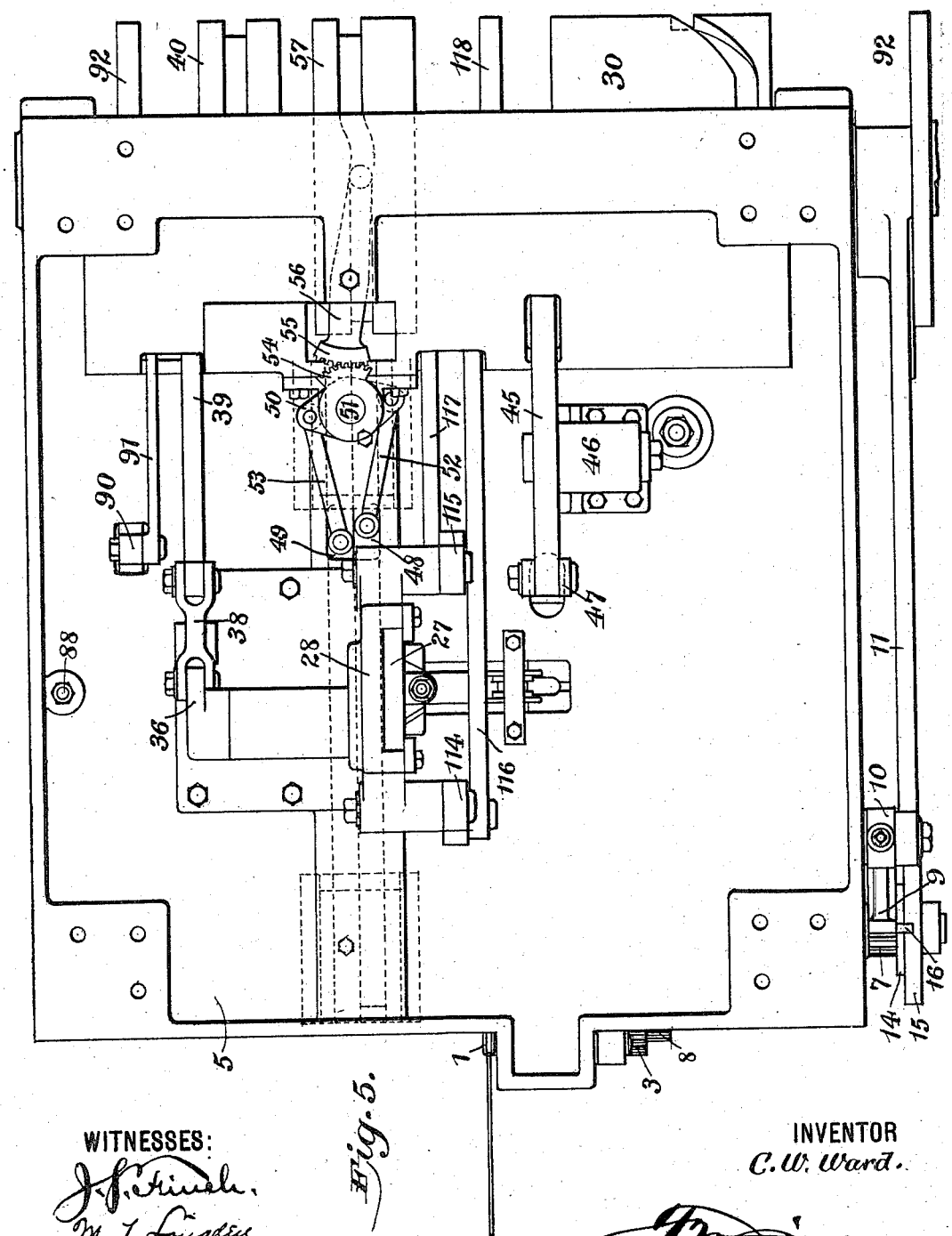
Figure 6:
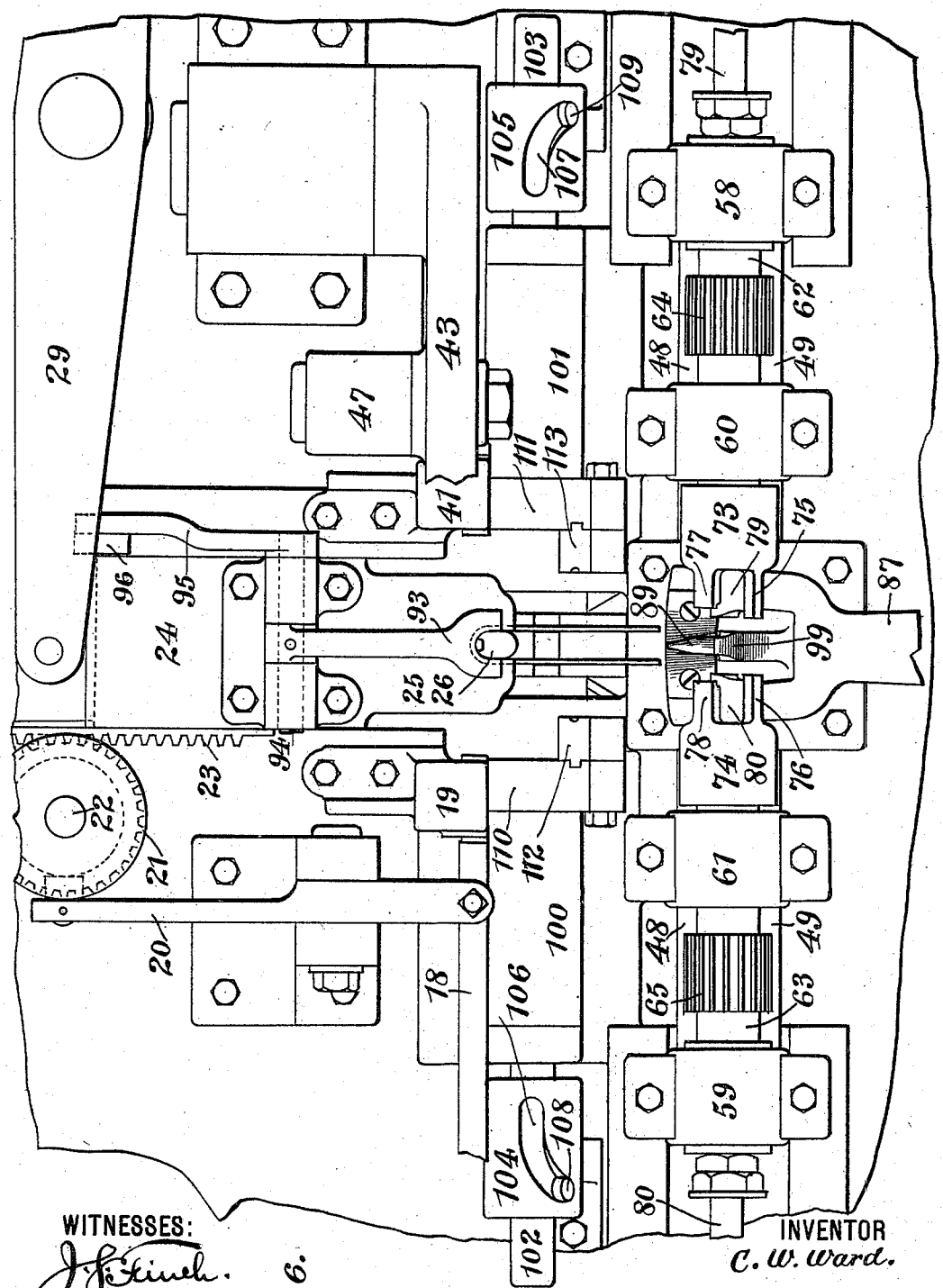
Figure 7:
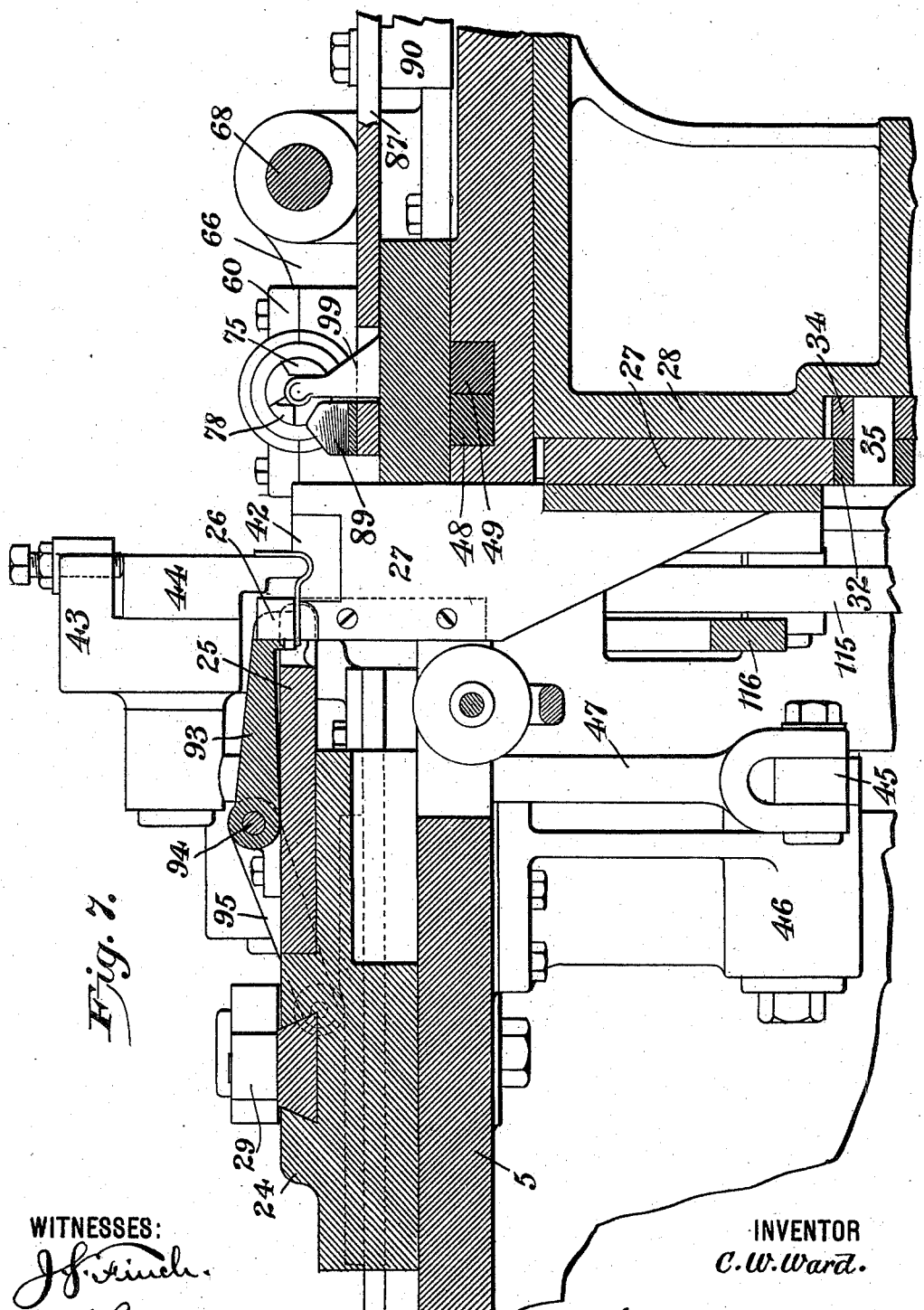
Figure 8:
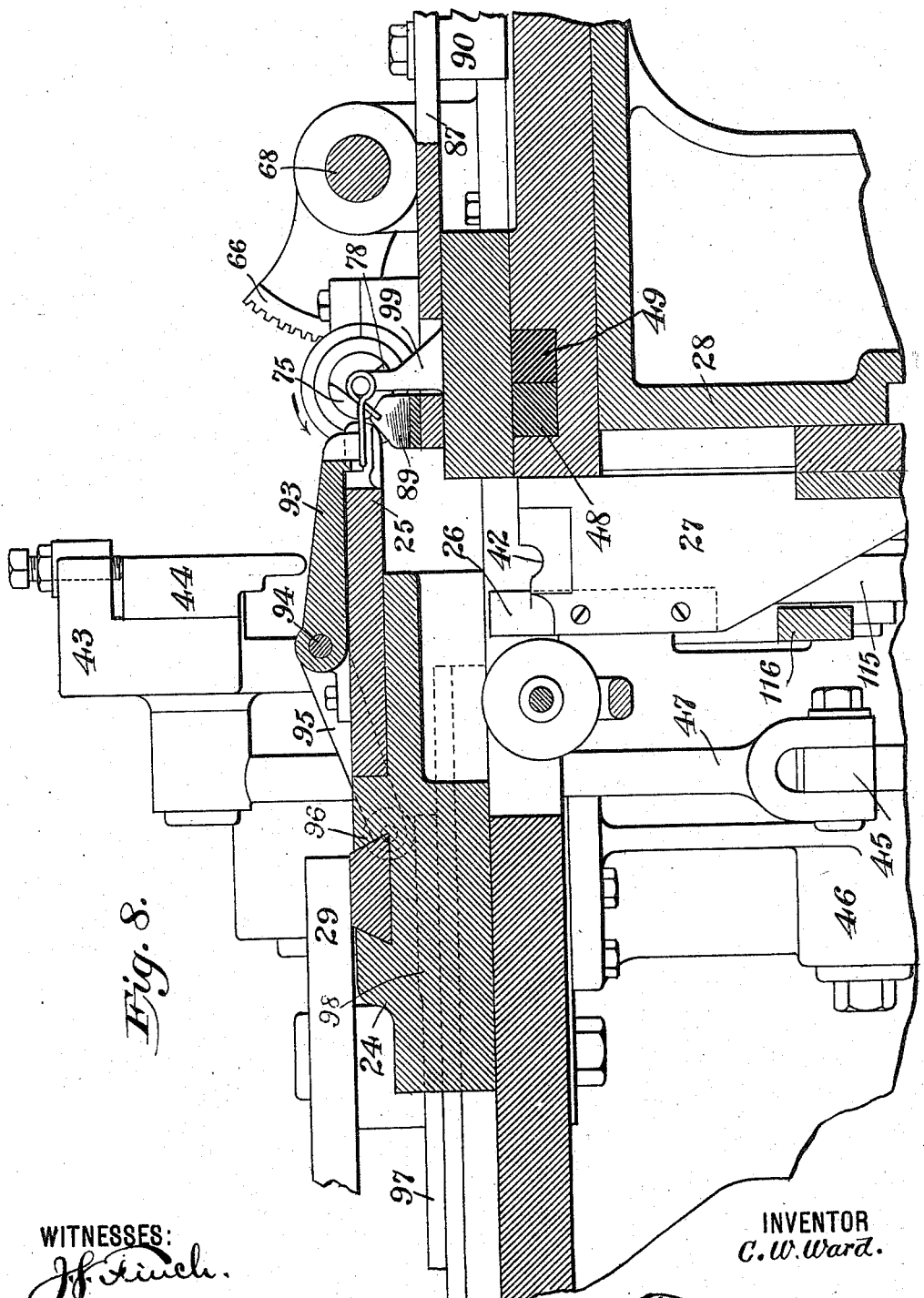
Figure 9:
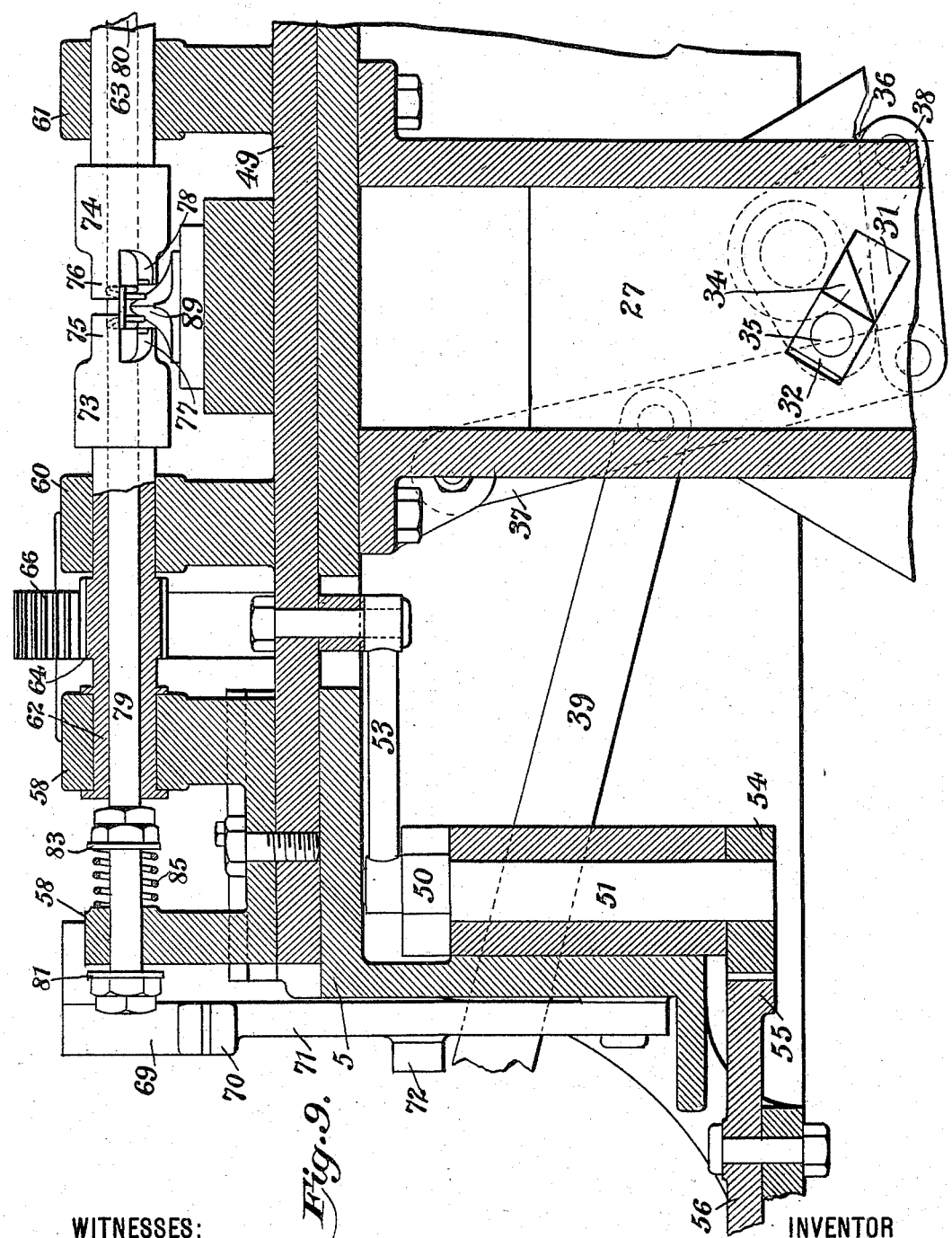
Figure 10:
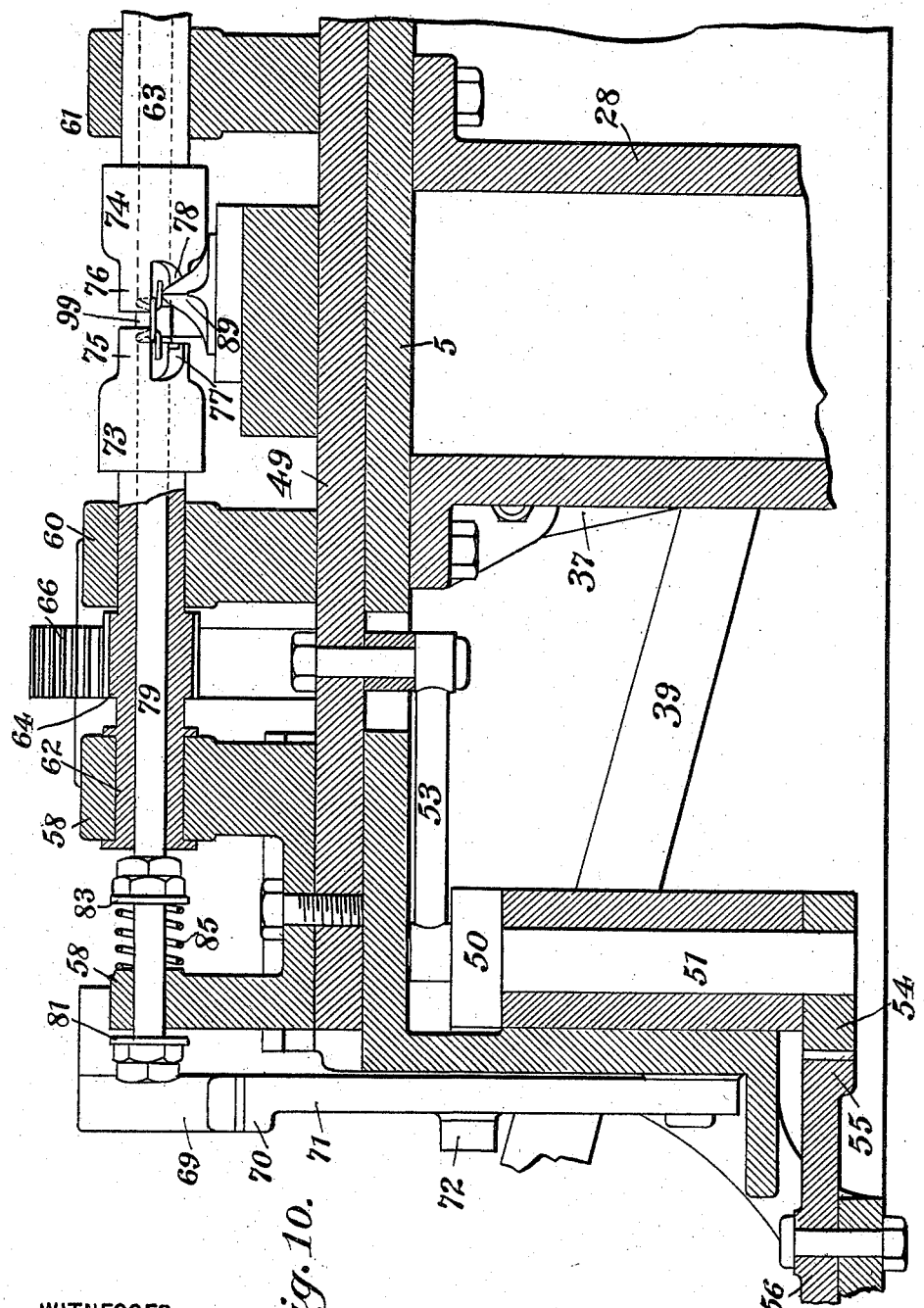
Figure 11:
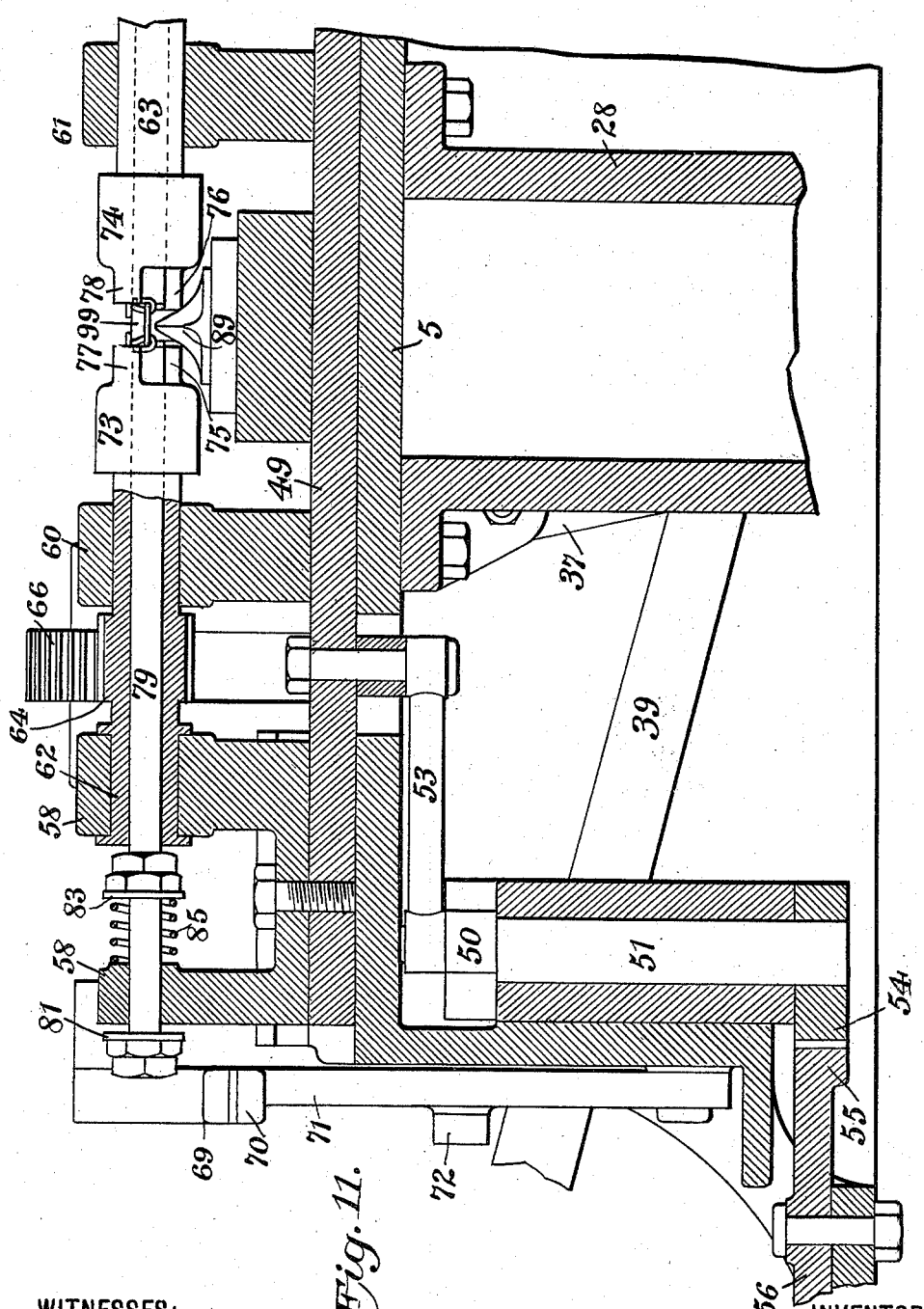
Figure 12:
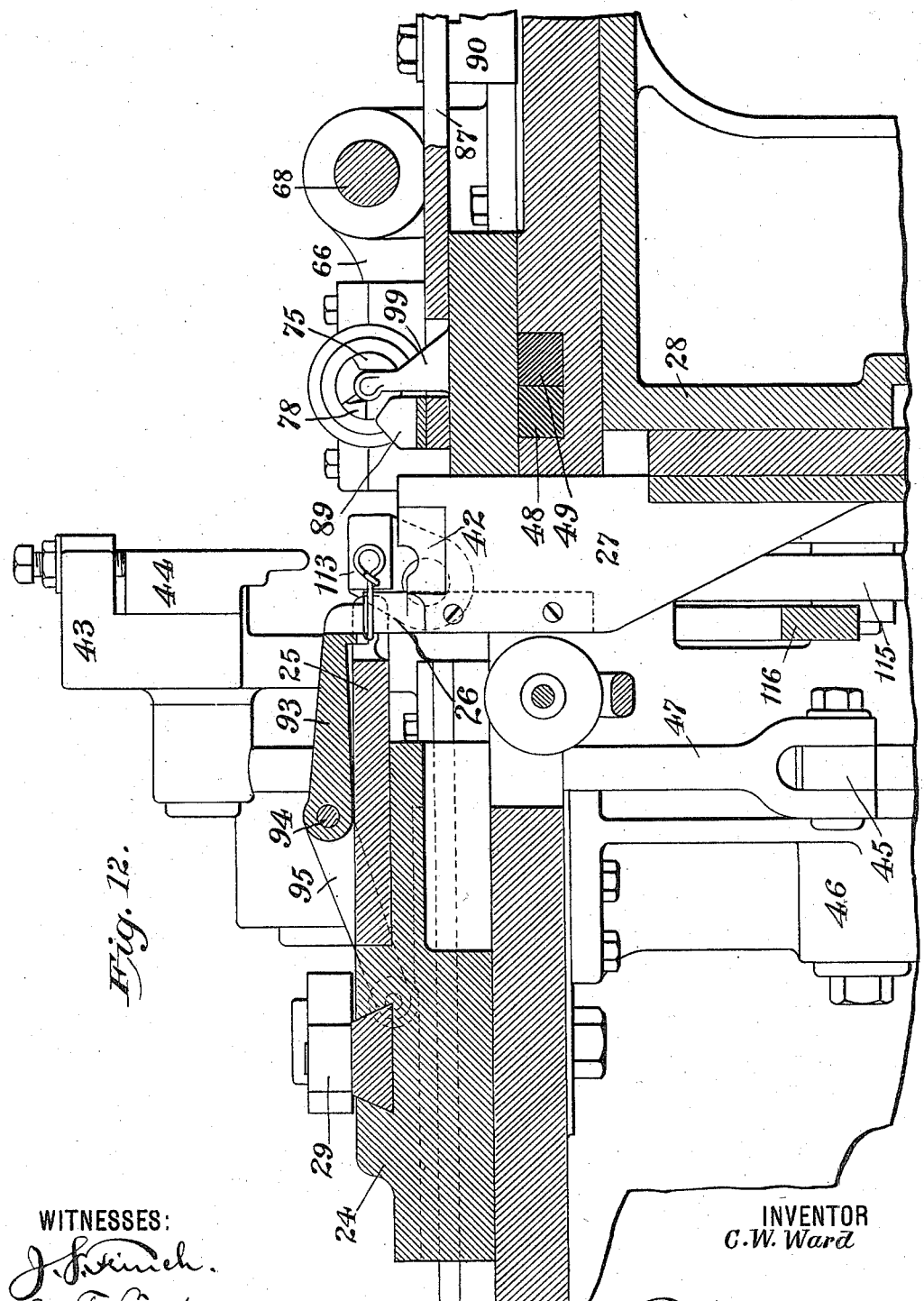
Figure 13:
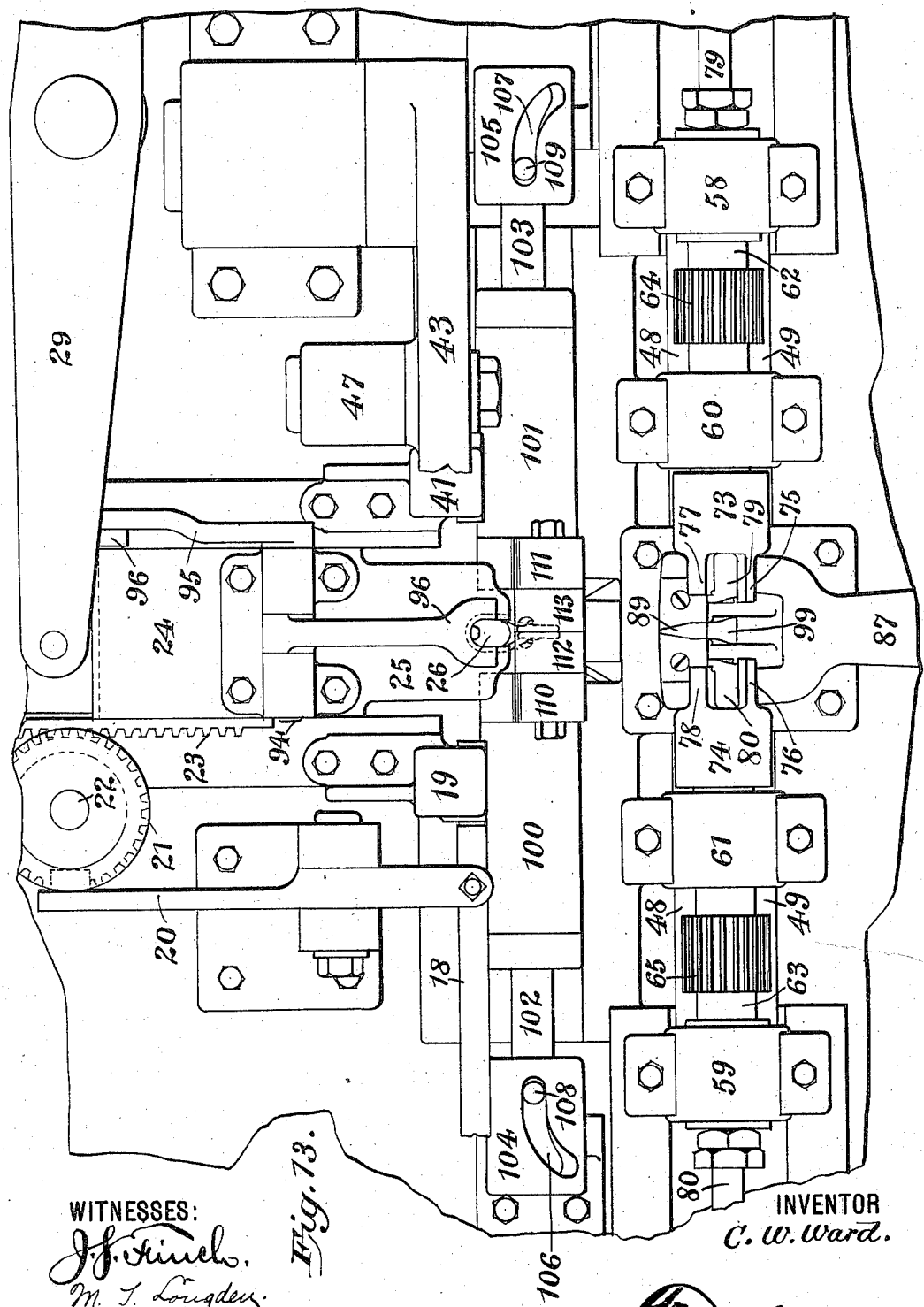
Figure 14:
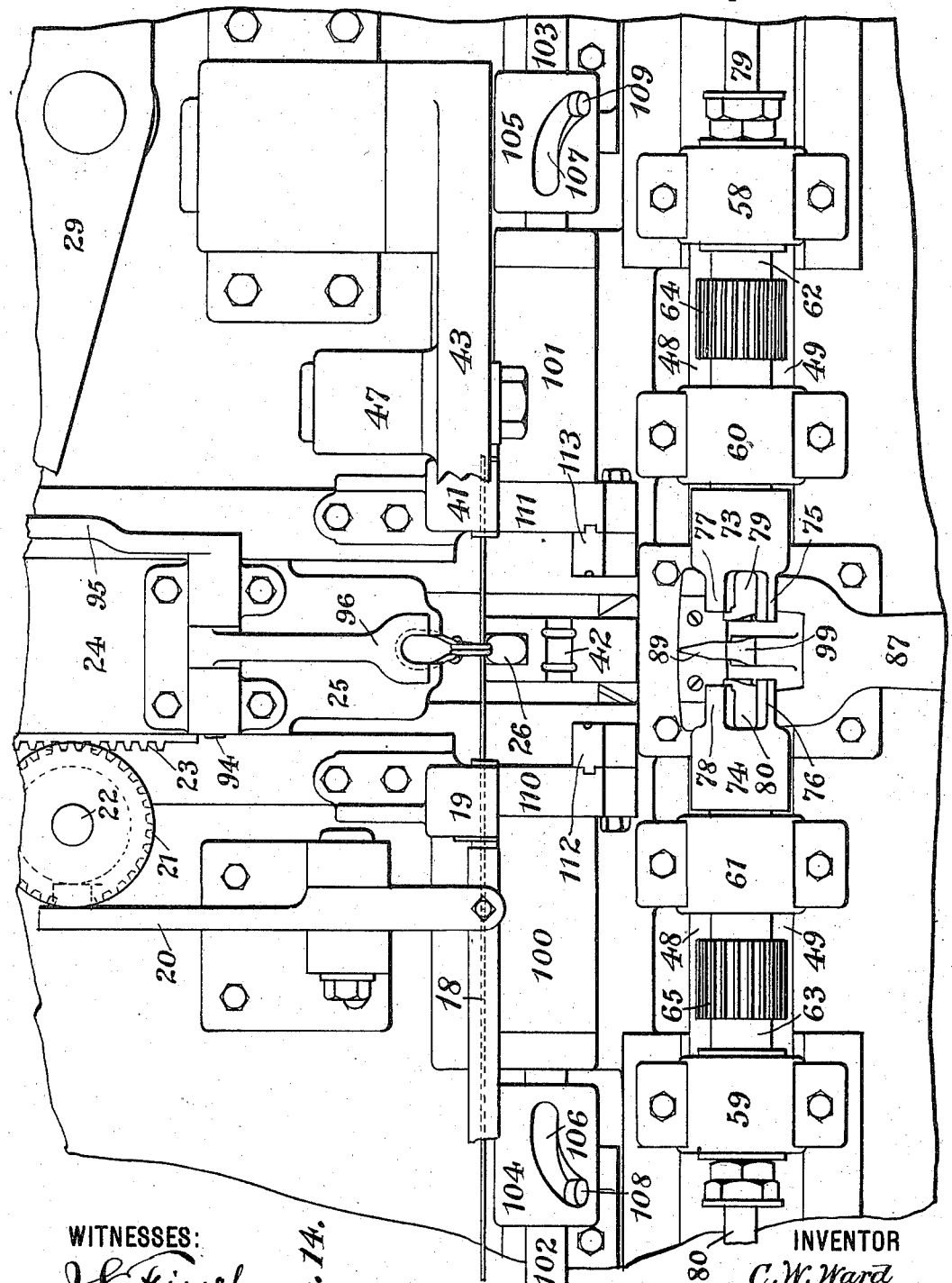
Figure 17:
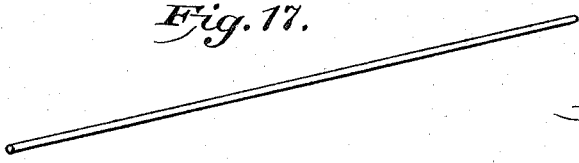
Figure 18:

In the accompanying drawings, which form a part of this application, Figure 1 is a plan view of my improved machine, the parts being shown in that position which they assume just after the feeding of the wire has taken place; Fig. 2, a section at the line *a a* of Fig. 1; Fig. 3, a section at the line *b b* of Fig. 1; Fig. 4, a section at the line *c c* of Fig. 1; Fig. 5, a bottom view; Fig. 6, a plan view similar to Fig. 1, but on an enlarged scale, partly broken away and showing the parts in position for effecting the first bending operation in the wire blank. Figs. 7 and 8 are sectional views similar to Fig. 4, but on an enlarged scale, partly broken away and respectively showing the parts in position for effecting the second and third bending operations. Fig. 9 is a sectional elevation taken on the line *d d* of Fig. 1, but on an enlarged scale, and showing the position of the parts preparatory to performing the fourth bending operation; Fig. 10, a view similar to Fig. 9, but showing the position of the parts just after the fourth bending operation has been completed. Fig. 11 is a view similar to Fig. 9, but showing the position of the parts after the fifth bending operation has been performed. Fig. 12 is a view similar to Figs. 7 and 8, but showing the parts in position preparatory to performing the sixth or last bending operation; Fig. 13, a view similar to Fig. 6, but illustrating the position assumed by the various parts in effecting the sixth bending operation; Fig. 14, a view similar to Fig. 13, but showing the proper position of the parts after a wire blank has been fed and delivered through the eyes of a previously-completed link. Fig. 15, Sheet 4, is a detail sectional elevation taken at the line *e e* of Fig. 1; Fig. 16, Sheet 4, a section on the line *f f* of Fig. 15; and Figs. 17, 18, 19, 20, 21, 22, and 23 are detail perspective views, respectively illustrating the wire blank and the various shapes into which it is formed by the several bending operations.

The particular link which my machine produces is not new, but is the link which is made by the machine shown and described in reissued Letters Patent No. 11,532, issued April 14, 1896, to Charles F. Smith; but in my improved machine I have made a radical departure in the manner of manufacturing this chain. Heretofore this sort of chain has been made by first completely forming the eyes at the ends of a straight blank and then bending said blank into U shape in such manner that these eyes will register. While there is no objection to making the chain in this manner, nevertheless I am enabled by my present improvement to perform the several bending operations very quickly, and my machine is exceedingly strong and is less complicated than such machines usually are.

All of the movements of the parts which come into immediate contact with the wire for performing the bending operations are effected and controlled from cams with the usual intermediate lever connections, and as this is an exceedingly old and well-known manner of controlling and operating wire-working tools I do not consider it necessary to describe such cams, levers, &c., and I will therefore merely call attention to these parts by numbers of reference.

I use a pair of rolls to feed the wire, although I can employ any of the well-known wire-feeds with equal facility. While I have shown this roll-feed together with the parts and connections for operating the same, I will not describe these parts or connections, but will call attention to the feed-rolls merely by numbers of reference.

My aim in describing my present improvement is to avoid all details which are not attached to material parts of my invention, and therefore I will merely refer to very many ordinary parts and constructions by numbers of reference, since those skilled in the art to which my invention appertains will readily understand all details as to the operations of these parts without further explanation.

In order that the operation of my improved machine may be more readily understood, I will in my description take up in the order in which they are performed the several bending operations, so that the manufacture of the link in its details may be followed more readily than would be the case if I first described all the parts of my machine and then summed up the general operation thereof.

As before stated, the wire is properly fed and cut off, and the blank thus presented is subjected to six (6) distinct bending operations, the first of which I will now describe.

As a preliminary to the description of the first bending operation, I will briefly refer to the means whereby the wire is fed and cut off, attention being particularly called to Figs. 1, 2, 15, and 16.

1 are ordinary feed-rolls carried by suitably-journaled shafts 2, on which latter are also meshing gears 3.

4 is a short shaft suitably journaled and supported on the bed 5 of the machine and carrying at its inner end a spur-gear 6 and at its outer end a pinion 7, which mesh, respectively, with the pinion 8 on one of the feed-roll shafts 2 and with a segment-gear 9 on the end of a rocker-bar 10, pivoted to the bed. This rocker-bar receives its movements through a lever 11, one end of which is secured to the lower arm of the rocker-bar, while the other extremity is loosely supported around the main shaft 12 and is provided with a friction-roll (not shown) which tracks within the groove of the face-cam 13, carried on said main shaft. Rigid with the pinion 7 is a hub 14, which pinion and hub are both loose on this shaft 4, and keyed rigidly to this shaft beyond the hub is a disk 15.

16 are fingers which are properly supported within the hub 14, so as to be carried thereby, and are radially disposed and are capable of a slight movement in the direction of their length. 17 are coil-springs whose extremities are connected to said fingers and to the hub 14, so that it will be clear that when said hub is revolved in the direction of the arrow the fingers will be thrown inwardly until they grip the periphery of the disk 15, whereupon the continued movement of the hub will effect the like movement of the feed-rolls. When the gear 7 and hub 14 are rotated in the reverse direction, the fingers will of course loose their grip on the disk and the feed-rolls will be stationary.

The above parts and the movements thereof will be readily comprehended as effecting the necessary intermittent feed of the wire.

The wire passes from the feed-rolls through a stout tube 18, which is pivoted at its outer end to the bed, so as to be capable of swinging movements, the forward extremity of this tube being against a shear-block 19, so that it will be clear that when the tube is swung the wire will be cut off close to the shear-block, the front of which latter is of course open to permit of the bending of the wire into U shape around the former, presently to be explained.

Pivoted to the bed is a lever 20, whose inner end is properly secured to the tube, while its outer extremity carries a friction-roll (shown in dotted lines) which tracks within the peripheral groove of a cam 21, carried by the shaft 22, properly supported on the bed 5. Revolving with this cam is a gear, (shown in dotted lines,) which latter meshes with a rack-bar 23, carried by a reciprocatory slide 24, guided within suitable ways on the bed. As this slide operates the lever 20 will be rocked up and down, thereby operating the tube 18 to cut off the wire. The first operation to which the wire blank thus cut off is subjected is the bending into U shape, and this is effected in the following manner, attention being called to Figs. 1, 2, 3, 4, and 6.

25 is a bending-head properly recessed and carried by the slide 24, and 26 is a former carried by a vertical reciprocatory gate 27, guided within suitable ways in a hanger 28, bolted to the under side of the bed. After the wire blank has been delivered across the face of the bending-block and the former elevated into position the slide 24 is operated to throw the bending-head forward, thus causing the blank to be bent around the former into U shape, as shown at Fig. 6. The slide 24 receives its movements through the medium of a lever 29, pivoted to the bed of the machine, one end of this lever being pivoted to the slide, while the other end is provided with a roll (not shown) which depends within the peripheral groove of a cam 30 on the main shaft 12. The gate 27 has an inclined slot 31, within which is a block 32, capable of moving freely therein, while a rock-shaft 33, journaled in the hanger 28, is provided with a crank 34, from the extremity of which latter projects a stud 35 loosely within the block 32. Another crank 36 extends from this shaft 33 and is connected with a lever 37 by means of a link 38, so that it will be clear that any swinging movement of the lever 37 will effect the rocking of the shaft 33, and consequently the vertical reciprocation of the gate 27. The lever 37 is pivoted at its upper end to the under side of the bed, and a bar 39 is pivoted at one extremity to this lever, the other end being loosely supported around the main shaft and provided with a friction-roll (not shown) which tracks within the groove of a face-cam 40, so that it will be clear that the proper movements of the gate 27 will be effected from this cam 40 through the medium of the various elements above referred to. The slide 24, during its initial movement to carry the bending-block against the wire blank, effects the depression of the tube 18 to properly cut off the blank before said block comes in contact with the wire, and the latter is properly supported by the shear-block 19 and also by the block 41 opposite thereto.

It now becomes necessary to completely form registering eyes by bending the extreme ends of the blank, and I accomplish this without disturbing in the slightest degree the normal horizontal plane of the loop end of the blank, this being a very important feature (although it is not new with me) in automatic machines of this description, since it must be remembered that a blank for a succeeding link must be threaded through the eyes of a previously-completed link, and if the normal elevation of the blank is at all disturbed then some mechanism must be employed to restore the blank to its normal position before a succeeding blank can be properly threaded.

Figure 19:
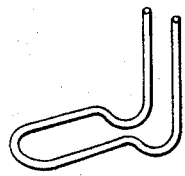
Figure 20:
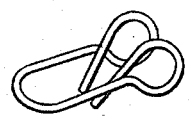
Figure 21:
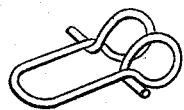
Figure 22:
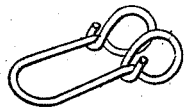
Figure 23:
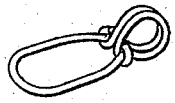

The second bending operation consists in forming a half-round bend with the extreme ends of the blank projecting upwardly, as shown at Fig. 19, and this operation is performed while the parts which effect the first bending operation are yet in their effective position.

Carried by the gate 27 is a female die 42, (clearly shown at Fig. 4,) and carried by an arm 43, pivoted to the bed, is a male die 44.

45 is a rock-lever pivoted to a hanger 46, bolted to the under side of the bed, the inner end of this lever being connected to the arm 43 at or about its middle portion by means of a link 47, while the outer end of this lever is provided with a friction-roll (not shown) which tracks within a groove in the side of the cam 30, so that it will be clear that the vertical movements of this arm 43 will be effected from the cam 30.

The first bending operation will leave the straight side wires of the blank resting immediately upon the die 42, and as the arm 43 descends the dies 42 44 will coöperate to bend the ends of the blank so that one-half of the eyes will be formed with the ends projecting upwardly, as shown particularly at Figs 7 and 19.

Immediately prior to the third bending operation the former and the die 42 are lowered by the operation of the cam 40, so as to leave the blank held and supported within the bending-head, and the latter is then bodily advanced by the continued movement of the slide 24, so as to bring the blank into proper position with respect to the instrumentalities which perform this third bending operation, and which I will now describe, reference being had particularly to Figs. 1, 5, 8, and 9.

48 49 are slides side by side within suitable ways in the bed and capable of free movements in the direction of their lengths, and 50 is a jog-link secured to a vertical rock-shaft 51, suitably supported below the bed. The two opposite extremities of this link 50 are respectively connected to the slides 48 49 by means of pitmen 52 53, whose ends are pivoted to said extremities and slides, so that it will be clear that the rocking movements of the shaft 51 will effect reciprocatory movements to both these slides. To the lower extremity of the rock-shaft 51 is secured a segment-gear 54, which meshes with a segment 55, carried by a lever 56, which latter is pivoted to the frame of the machine at or about its middle portion and carries at its outer end a roll (not shown) which tracks within the groove of the cam 57, as shown partly in solid and partly in dotted lines at Fig. 5, so that it will be clear that the proper reciprocations of these slides will be effected from this cam. Respectively bolted upon these slides are uprights 58 59, and rising from the bed are uprights 60 61. Within the uprights 60 61 and the inner uprights 58 59 are journaled hollow shafts 62 63, which are free to rotate, but have no lengthwise movements independent of the uprights 58 59. These hollow shafts carry pinions 64 65, which are engaged by segments 66 67, which latter are secured to a horizontal rock-shaft 68, journaled on the bed of the machine, to one end of which shaft is secured another segment 69, which in turn meshes with a segment 70, formed on a lever 71, which latter is pivoted at its lower end to the frame of the machine and carries a roll 72, which tracks within the peripheral groove of the cam 40. The revolution of this cam 40 effects the rocking of the segment 70, whereby rocking movements are imparted to the shaft 68, thereby causing the shafts 62 63 to be revolved first in one direction and then in the other, for the purpose presently to be explained. The inner extremities of these shafts 62 63 carry bending-heads 73 74, which latter are respectively provided with long bending-lips 75 76 and short bending-lips 77 78, which lips are eccentric to the axis of said heads.

Extending loosely through the hollow shafts 62 63 are horizontally-disposed mandrels 79 80, which are capable of free sliding movements independent of said hollow shafts. The outer portions of these mandrels extend loosely through the outer uprights 58 59 and are provided at their extreme ends with adjustable stop-shoulders 81 82, while around these mandrels, immediately beyond the outer extremities of the hollow shafts, are adjustable shoulders 83 84, between which last-named shoulders and the inner walls of the outer uprights 58 59 are coil-springs 85 86 around said mandrels. It will thus be clear that when these uprights 58 59 are carried toward each other by the action of the slides 48 49 the mandrels 79 80 will be carried therewith, but that when the inner extremities of these mandrels strike against any shoulder or abutment the inward movements of said uprights will not be arrested thereby, but will continue independent of said mandrels, with the result that the springs 85 86 will be compressed, so as to bind said mandrels firmly against said abutment.

87 is a bar pivoted at 88 upon the bed-plate and capable of a free lateral reciprocation. Upon the extreme inner end of this bar is an anvil 89, which is of a general conical shape in cross-section, that is to say—its sides are inclined—as is shown at Figs. 8 and 9.

90 is a slide within suitable ways on the bed and pivoted to the bar 87 about midway of its length.

91 is a lever immediately beneath the bed and pivoted at one end to the slide 90, while the other extremity is supported by the shaft 12 and is provided with a roll (not shown) which tracks within the groove of the face-cam 92, so that it will be clear that the rotation of this cam will effect the proper reciprocatory movements of the bar 87.

It will be remembered that immediately after the second bending operation the former and dies were withdrawn preparatory to the movement of the slide 24 to bring the blank in position for subsequent bending operations, thus leaving the blank without adequate support to prevent displacement during such operations. I have provided a clamping mechanism whereby the blank will be firmly held during these operations and which is brought into effective position before the third bending operation is performed. This clamp comprises a dog 93, rigid on a rock-shaft 94, which latter is carried by the slide 24, the nose of said dog being capable of entering the recess in the bending-head and binding firmly against that part of the wire blank which constitutes the loop of the link.

95 is a crank which extends from the shaft 94 and is provided at its lower or free end with a roll 96, which rests upon a track 97, secured to the bed. The inner portion of this track is elevated, as seen at 98, the two portions of the track being connected by an incline. (Shown in dotted lines at Fig. 8.) As the slide 24 moves inward the roll 96 will travel up onto the elevated portion 98 of this track, thereby causing the nose of the dog 93 to be depressed, so as to firmly clamp the blank, and when the slide is retracted the crank 95 and the roll carried thereby will by their combined weight effect the elevation of the dog when the roll travels along the outer or lower portion of the track. Therefore it will be clear that during the movement of the slide 24 which brings the blank into position for the third bending operation said blank will be firmly clamped as against any displacement. In performing this third bending operation the slides 48 49 operate to throw the bending-heads 73 74 and the mandrels 79 80, carried thereby, toward each other, and I have provided an abutment 99, rising from the bed and against which said mandrels are forced and are firmly bound by the continued inward movement of the bending-heads, which latter is necessary in order to bring the lips 75 76 athwart and behind the upwardly-projecting extremities of the wire blank. The shafts 62 63 are now rotated by the instrumentalities hereinbefore set forth, thereby revolving the bending-heads and causing the lips 75 76 to bend the extremities of the wire blank to the position shown at Figs. 8 and 9. Simultaneously with the revolution of these bending-heads the latter advance slightly still farther inward, whereby the ends of the wire as they are bent will be thrown inwardly, so that they will be passed inside of that portion of the blank which forms the loop. This will cause these extremities of the partially-completed link to depend on opposite sides of the anvil 89, and the parts are then in position for performing the fourth bending operation, which latter is effected by the shifting movements of this anvil, as I will now describe.

When the parts are in position as shown at Figs. 8 and 9, the bar 87 is shifted laterally first in one direction and then in the other, whereby the anvil 89 is forced against the depending extremities of the wire to spread them laterally to the position shown at Fig. 10, and this completes the fourth bending operation. The extremities of the wire when thus spread are within the field of operation of the short bending-lips 77 78, so that it will be clear that when the bending-heads are revolved in the direction reverse to that previously set forth these short lips will bend up said extremities to the position shown at Figs. 11 and 22, which completes the fifth bending operation. These reverse movements of the bending-heads are of course effected from the vertical rocking movements of the segments 66 67, and during said movements there will be a dwell in the action of the slides 48 49, and also while the third, fourth, and fifth bending operations are being performed the mandrels 79 80 will be stationary and will of course act as firm supports for the wire.

After the completion of the fifth bending operation the bending-heads 73 74 are retracted, thus leaving the partially-completed link supported within the bending-head 25, and the slide 24 is now operated to retract said head and the partially-completed link to the position shown at Figs. 12 and 13, where the eyes of said link are immediately in front of the instrumentalities for performing the sixth and last bending operation, which latter consists in finally curling the extremities of the wire inwardly against the eyes and also in completely shaping the link. When the bending-head 25 has been retracted to this position, the former 26 is elevated, so that it again enters the loop within said head, where it remains until the link is completed.

Referring particularly to Figs. 1, 3, 12, 13, and 23, 100 101 are slides properly guided upon the bed of the machine, and 102 103 are rotary spindles supported in said slides, but incapable of any lengthwise movement independent of the latter. The outer extremities of these spindles are supported within suitable boxes 104 105, in which latter are formed curved slots 106 107, within which studs 108 109 extend from said spindles. Secured upon the inner extremities of the spindles 102 103 are heads 110 111, and eccentrically carried by said heads are the closing-in dies 112 113. In Fig. 14 these dies are shown out of operative position, while in Fig. 13 they are shown in their elevated or operative position.

Right here I desire to state that no stress is to be placed upon this construction just described, which contemplates the slots 106 107 and the studs 108 109, since such construction is a mere expedient to throw the dies out of the way of the wire blank when the latter is bent into U shape. This construction is preferable to the performing of the first bending operation at a farther distance from the vertical plane in which the last bending operation is performed, and this is the sole reason for this present construction.

114 115 are levers pivoted at their lower extremities to the hanger 28 and having their upper extremities loosely connected in any ordinary manner with the slides 100 101.

116 117 are levers whose inner extremities are pivoted, respectively, to the levers 114 115 about midway of the latter, while the outer extremities of these levers 116 117 are loosely supported around the shaft 12, said levers being respectively provided with rolls (not shown) which track within grooves in the face-cams 118 57. The rotation of these cams will cause these levers 114 115 to be thrown toward each other, thereby carrying the slides 100 101 inwardly and bringing the closing-in dies into effective operation against the link, whereby the extreme ends of the wire are curled against the eyes and the link itself completely closed and shaped around the former 26, as shown at Fig. 13.

The link is now completed and the closing-in dies are retracted and the former 26 is withdrawn from the link, whereupon the slide 24 operates to still further draw back the bending-head carrying the completed link until the registering eyes of said link are in such a position with respect to the feedway of the wire that the latter when fed will pass through the eyes of this previously-formed link, as shown at Fig. 14.

After a succeeding blank has been passed through the eyes of a previously-formed link the slide 24 is operated to finally withdraw the bending-head 25, so that the completed link is stripped therefrom, it being of course understood that during the retraction of this head the dog 93 will have been elevated to release the link.

After a completed link has been stripped from the bending-head 25 the various parts and instrumentalities will be in the position shown at Fig. 4 and the completed chain will depend from the blank that has been fed into position preparatory to bending, and the various bending operations hereinbefore described will then take place with respect to this blank.

I do not wish to be limited to the employment of any particular mechanical appliances for handling and bending up the wire blank into the form of a completed link, since it will be clear that in this respect there are a great many substitutions of mechanisms which may be made and which are all within the range of ordinary mechanical skill.

The end aimed at by my present invention is to bend up the eyes in the vertical plane which they occupy with respect to the horizontal plane of the loop, since I am thereby enabled to make a stronger and more compact machine.

Having thus described my invention, what I claim as new, and desire to secure by Letters Patent, is—

1. In a machine for manufacturing chain from wire blanks, the combination of mechanism for first bending the blank into U shape whereby the loop is formed, means for bending the extremities of the blank in the same arc, instrumentalities for passing said extremities within the loop and locking them around the side wires of such loop whereby registering eyes are formed at right angles to the horizontal plane of the loop, and means for finally shaping the link thus partially formed, substantially as set forth.

2. In a machine for making wire chain, the combination of means for bending the blank into U shape, means for forming one-half of the eyes with the extreme ends of the blank extending upwardly, means for curling said ends downwardly within the loop, means for spreading said ends horizontally in opposite directions, means for bending said ends upwardly, and instrumentalities for curling the ends inwardly against the eyes and for finally shaping the link, substantially as set forth.

3. In a machine for manufacturing wire chain, the combination of means for feeding and cutting off the wire blank, means for bending the blank into U shape, a pair of dies for bending the ends of said blank whereby one-half of the eyes is formed with the extreme ends of the blank projecting upwardly, a pair of mandrels and bending heads and means for advancing the same laterally toward the link whereby the wire for the eyes is properly supported, means for rotating said heads in harmony first in one direction and then in the other whereby the ends of the blank are curled downwardly within the loop and upwardly outside of said loop, a laterally-reciprocating anvil whereby the ends of the blank are spread laterally in opposite directions preparatory to the last-named function of the bending-heads, and means for finally bending the extreme ends of the blank inwardly and for completely shaping the link, substantially as set forth.

4. In a machine for manufacturing wire chain, the combination of the former and bending-head whereby the first bending operation is performed, the pair of dies whereby the second bending operation is performed, the sliding and rotatory bending-heads carrying the mandrels whereby the third and fifth bending operations are performed, the laterally-shifting anvil whereby the fourth bending operation is performed, means for properly sliding the bending-head whereby the link is presented to the several bending instrumentalities, means carried by said head for properly clamping the link, and means for finally curling the extremities of the wire inwardly and completely shaping the link, substantially as set forth.

5. In a machine for automatically making wire chain the links of which have a loop at one end and eyes at the other end, the combination of instrumentalities for first forming the loop, with means for bending the free end portions of said loop in arcuate planes which substantially coincide, and instrumentalities for curling the extremities of said end portions around the side wires of the loop whereby registering eyes are formed at right angles to the plane of said loop, substantially as set forth.

6. In a machine for automatically making wire chain, the combination of the former and dies, the mechanism for bending the extremities of the wire and completing the eyes, instrumentalities for finally shaping the link, the reciprocatory bending-head, and means for shifting said head in the several proper relative positions with respect to said former and dies, said mechanism and said instrumentalities whereby the various bending operations are performed and the link completed, substantially as set forth.

In testimony whereof I affix my signature in presence of two witnesses.

CUMMINS WILMINGTON WARD.

Witnesses:
F. W. SMITH, Jr.,
M. T. LONGDEN.